United States Patent [19]

Johnston

[11] Patent Number: 4,549,638

[45] Date of Patent: Oct. 29, 1985

[54] ROLLER CLUTCH ADJUSTABLE FORCE SPRING MOUNT

[75] Inventor: Albert D. Johnston, Huron, Ohio

[73] Assignee: General Motors Corporation, Detroit, Mich.

[21] Appl. No.: 521,676

[22] Filed: Aug. 10, 1983

[51] Int. Cl.[4] .............................................. F16D 41/06
[52] U.S. Cl. ...................................................... 192/45
[58] Field of Search ...................... 192/45, 45.1, 41 R, 192/41 A

[56] References Cited

U.S. PATENT DOCUMENTS

| | | | |
|---|---|---|---|
| 2,044,197 | 6/1936 | Barthel | 192/45 |
| 3,187,869 | 6/1965 | Spencer | 192/104 |
| 3,688,882 | 9/1972 | O'Malley | 192/45 |
| 3,820,406 | 6/1974 | Toulier | 192/42 X |
| 4,368,809 | 1/1983 | Husmann | 192/45 |
| 4,415,072 | 11/1983 | Shoji et al. | 192/45 |
| 4,422,537 | 12/1983 | Ritter et al. | 192/45 |

FOREIGN PATENT DOCUMENTS 1533946 7/1968 France .

Primary Examiner—William A. Cuchlinski, Jr.
Attorney, Agent, or Firm—Patrick M. Griffin

[57] ABSTRACT

A one-way clutch of the type having a spring biased roller engaged with inclined ramps has a roller retention cage with spring mounting blocks mounted thereto by inclined tracks. The spring mounting blocks are movable along the track under the centrifugal force of the over-running clutch to further compress the spring to provide increased energizing force to in turn prevent roller drift along the inclined ramp.

2 Claims, 3 Drawing Figures

ROLLER CLUTCH ADJUSTABLE FORCE SPRING MOUNT

BACKGROUND OF THE INVENTION

One-way clutches are used when it is desired to let a rotating member or race rotate freely in only one direction relative to another member, and are generally of the sprag element type or the roller type. In the sprag element type, both members or races present cylindrical surfaces to the sprag elements, but in the roller type either an inner or outer race has a series of cam ramps cut therein. A series of rollers, one for each cam ramp, are held in a cage which is tied to the cam race and a series of energizing springs mounted to the cage continually urge each roller into a ready position of touching engagement with one of the cam ramps on the cam race and with the other race, or ring, which is cylindrical.

In the case of the outer cam design, when the cam race is over-running the inner ring, the clutch will be "centrifugally disengaging" above a certain critical speed. That is, above the critical speed, the rollers will experience enough centrifugal force to overcome the spring force of the energizing spring and will move out of ready position up the ramp to become disengaged from the inner ring. In applications where it is important to have a quick lock-up, as in an automatic transmission stator, operation at speeds above critical speed is difficult. While inner cam designs are more centrifugally neutral, at certain high critical speeds of the over-running inner cam race relative to the outer ring the cam ramp may get sufficiently "ahead" of the roller that a similar disengagement and high speed instability of the roller occurs.

In some applications, such as the over-running clutch in a starting motor, the centrifugal disengagement is actually desirable to cut down on friction in the over-running mode. U.S. Pat. No. 2,044,197, to Barthel, shows an over-running clutch for such an application in which energizing springs bear not directly on the rollers, but upon pivoted blocks which bear on the rollers. In the over-running mode, centrifugal force pivots the blocks against the springs and allows the rollers to move from the cam ramps. This is desirable in the starter motor application, where quick lock-up is not necessary and where the clutch is usually in the over-running mode, as it reduces friction. A transmission presents a different problem, and must be able to provide quick lock-up response.

SUMMARY OF THE INVENTION

The subject invention provides a roller clutch which overcomes the centrifugal disengagement problem discussed and allows one-way roller clutches to be used in applications at higher than conventional critical speeds. A roller clutch having a conventional series of caged rollers includes a series of novel spring mounting blocks, each of which is slidably mounted to the roller cage by guide tracks inclined in a direction, measured relative to a radial line of the clutch, which is opposite to the incline of the ramps. Conventional energizing springs mounted to the movable blocks bear on the rollers and urge them into a ready position of touching engagement with a cam ramp on the outer race as well as with the cylindrical inner race or ring. At higher relative speeds of rotation, the centrifugal force which can cause disengagement of the rollers in a conventional design will cause the movable spring mounting blocks to move or slide within the tracks in a direction opposite to the direction of the cam ramp, putting more force on the spring to prevent the roller from moving along the roller. This force is proportional to the speed of angular rotation, because a higher speed provides more centrifugal force. Therefore, the use of the roller clutch at speeds above normal critical speeds is possible with the rollers maintained in ready position for the quick lock-up necessary in transmission and other like applications. The roller clutch design is otherwise conventional, and fits easily in the available space between the cam race and the inner ring, and operates conventionally at lower speeds.

It is, therefore, an object of the invention to provide a one-way roller clutch which overcomes the roller centrifugal disengagement problem and may be used at higher than critical speeds.

It is another object of the invention to provide such a one-way clutch in which the energizing springs which maintain the rollers in a ready position of touching engagement between the cam ramps and the cylindrical surface are provided with a means responsive to the centrifugal force tending to move the rollers out of ready position to increase the spring force on the rollers to maintain them in ready position.

It is a further object of this invention to provide such a roller clutch having movable spring mounting blocks mounted to the cage by inclined tracks and movable therealong to further compress the energizing springs in response to increased relative speed of angular rotation to prevent the rollers from moving along the cam ramps and out of ready position.

It is a further object of this invention to provide such a roller clutch which is of substantially conventional design and which operates conventionally at lower speeds.

BRIEF DESCRIPTION OF THE DRAWINGS

These and other objects of the invention will appear from the following written description of the drawings in which.

Figure 1:
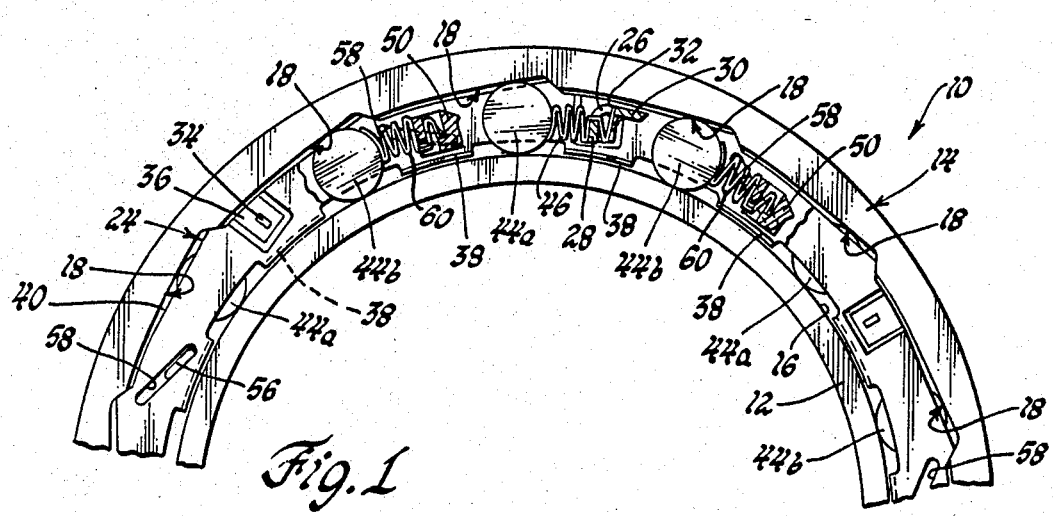
FIG. 1 is a view of a section of the roller clutch contained between the cam race and inner ring.

Referring first to FIG. 1, the roller clutch of the invention designated generally at 10 is shown in place between a cylindrical inner race or ring 12 and a concentric outer cam race 14. Inner ring 12 presents a cylindrical surface 16 to roller clutch 10 while cam race 14 has a series of generally saw tooth shaped cam ramps 18 cut therein. Each cam ramp 18 has a relatively shallow roller engaging surface 20 inclined in one direction relative to a radial line of the clutch 10, labeled "R", and a relatively sharper surface 22, sometimes known as the "hook".

Several elements of roller clutch 10 are conventional, with a pair of generally annular, parallel side rails 24 located in the generally annular space between races 14 and 12, one of which is visible. Side rails 24 are maintained in spaced parallel by a series of circumferentially spaced cross bars 26 visible in FIG. 2, which have a generally L shaped configuration with a radially extending wall 28 and a generally circumferentially extending wall 30 with a slot 32 therethrough, which serves a purpose to be described below. An ear 34, best visible in FIG. 1, at each end of wall 28 extends through a slot in side rail 24 where it is stamped and crimped over, leaving a slight dimple 36. This maintains side rails 24 together as a substantially rigid cage assembly. The inner periphery of side rails 24 includes circumferentially spaced pairs of inwardly turned bearing flanges 38 and the outer periphery includes matched pairs of clutch cam surfaces each comprising a relatively longer edge 40 cut at a slightly shallower angle than its matching cam ramp surface 20 and a backstop surface 42 closely engageable with a hook 22, all conventional features. The cage assembly formed by side rails 24 and cross bars 26 turns, in the over-running mode, with outer cam race 14 and rides on surface 16 of ring 12 on a film of oil formed beneath the bearing flanges 38.

A series of rollers 44a and 44b are confined axially between side rails 24, each cam ramp surface 20, and ring surface 16. Each roller 44a and 44b operates in a conventional fashion when in the lockup mode of FIG. 2, with cam race 14 being prevented from rotating relative to ring 12 in the direction of the arrow. Each roller 44a is respective to a cross bar 26 and is biased by a conventional energizing spring or "tickler" spring 46, which has a U-shaped clip at one end which fits over wall 28 through slot 32, the free end of which has a locking tab 48 engageable with the underside of wall 30. A spring 46 bears on each roller 44a, maintaining it in a ready position of touching engagement with the surfaces described above. In this ready position, rollers 44a and 44b are properly positioned to quickly respond to a change in relative direction between races 12 and 14. But as may be seen in FIG. 3, when outer cam race 14 is over-running relative to ring 12 in the opposite direction shown by the arrow, rollers 44a may at a certain critical speed move out of ready position, up their cam ramp surfaces 20, and out of engagement with ring surface 16 as they compress their springs 46.

Figure 2:
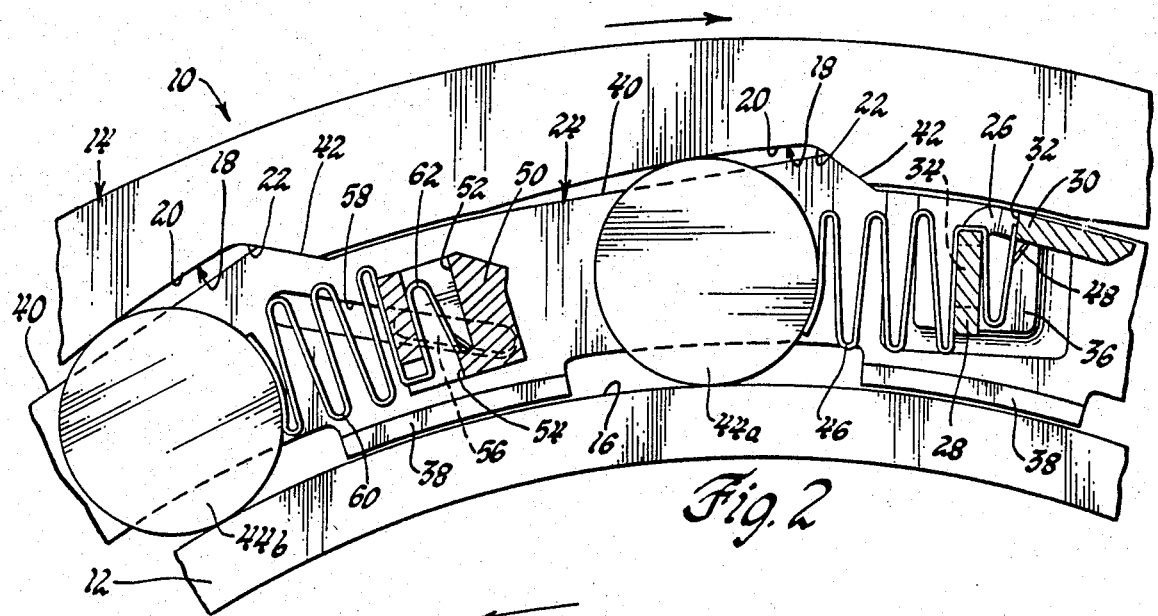
FIG. 2 is an enlargement of FIG. 1 showing the position of the rollers during lock up.
Figure 3:
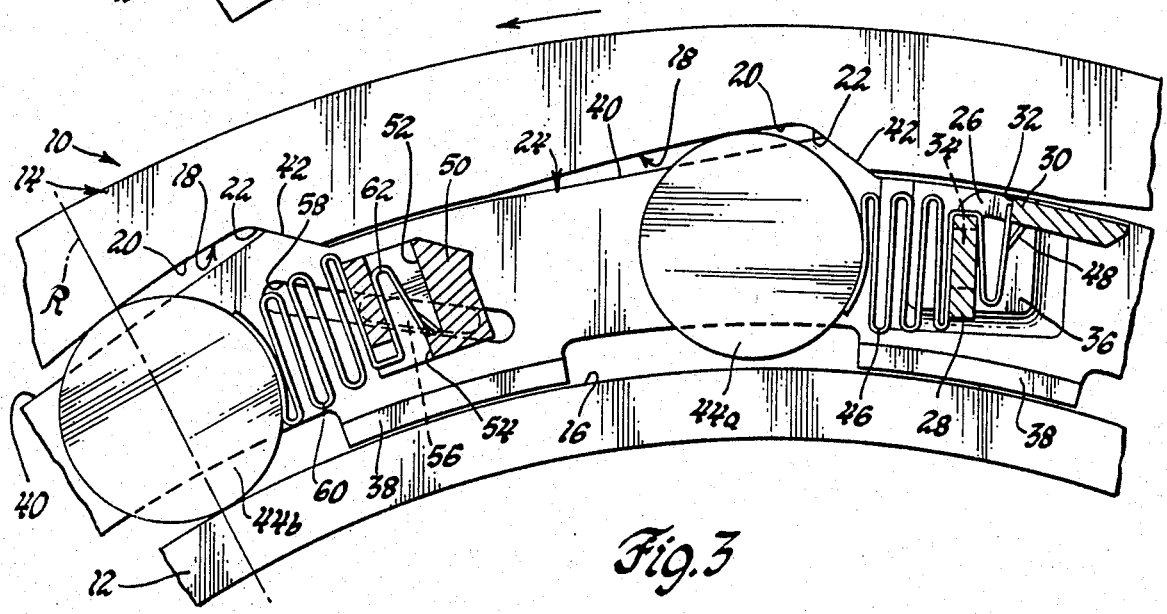
FIG. 3 is a view similar to FIG. 2 but showing the position of the rollers and spring mounting blocks in the over-running mode at higher than critical speed.

This problem of roller drift is overcome by the speed compensating spring mount of the invention, best visible in FIGS. 2 and 3. Every other roller 44b is respective to a movable spring mounting block 50, formed from any suitable material, such as metal or plastic, which has a generally block shape with a central, generally radially extending slot 52 therethrough having a shoulder 54. Each side of block 50 includes a pair of guide track followers 56 which project through a pair of matched, longer guide track slots 58 in side rails 54 which are inclined in an opposite direction relative to line "R". Guide track slots 58 are aligned through side rails 24 and provide a stable guiding means. A tickler spring 60, similar to spring 46, has a U-shaped end 62 which snap fits within slot 52, its free end engaged with shoulder 54.

Spring 60 biases its respective roller 44b in identical fashion to spring 46 when roller clutch 10 is in the lockup mode of FIG. 2. However, in the FIG. 3 over-running mode, it may be seen that movable block 50 slides radially outwardly and circumferentially toward roller 44b as guide track followers 56 move within guide track slots 58 under the same centrifugal force which would otherwise cause its roller 44b to disengage from ring surface 16, as has the adjacent roller 44a in FIG. 3. Consequently, spring 60 is further compressed as block 50 moves, proportionally increasing the force of spring 60 with increasing speed to maintain its roller 44b in continual engagement with cam ramp surface 20 and ring surface 16, in proper position for quick lock-up. Thus, roller clutch 10 may be operated at higher than usual critical speeds, higher speeds of operation than previously possible.

Only every other roller 44b is provided with the mounting block 50 of the invention, this being done in the interest of compactness. The cross bars 26 are necessary for rigidity and necessary for the other spring mounts, but every roller could be provided with the invention if a separate means were provided for maintaining side rails 24 as a rigid roller retention cage. Other shapes could be provided for spring block 50, and spring 60 could be mounted to block 50 in other ways. Also, the guide track followers 56 and guide track slots 58 could be reversed. In addition, the same design could be incorporated on an inner cam roller clutch, if desired, as long as the cam ramps and guide track slots were oppositely inclined. Additionally, an arcuate shape could be provided to the guide track slots 58 and guide track followers 56, as long as the general incline direction was the same. This would provide a slight change in the attitude or angle of the mounted end of the energizing spring 60 as the block so moved, which may be desirable for some spring geometries.

The embodiments of the invention in which an exclusive property or privilege is claimed are defined as follows:

1. In a one-way clutch of the type allowing an over-running member to freely rotate in one direction relative to another member concentric thereto while preventing relative rotation in the opposite direction, and in which a series of rollers are held in a cage mounted to the over-running member, the rollers being movable toward a ready position of touching engagement between cam ramps on the over-running member inclined in one direction relative to a radial line of the concentric members and a cylindrical surface on the other member to respond to a change in the direction of relative rotation between the members, said clutch having energizing springs for biasing the rollers toward ready position,
   an improved means for adjusting the biasing force of at least some of the springs, comprising,
   means responsive to the centrifugal force of the rotating over-running member providing an increased biasing force on the springs to counteract the effect of the over-running member induced centrifugal force on the rollers and to maintain the rollers in their ready position for quick response to a change in direction of relative rotation between the members, thus allowing the over-running member to rotate at higher speeds normally tending to cause the rollers to move out of ready position.

2. In a one-way clutch of the type allowing a first, over-running member to rotate freely in one direction relative to a second member concentric thereto, while preventing relative rotation in the opposite direction, and in which a series of rollers are held in a cage mounted to the over-running member, the rollers being confined between cam ramps on the over-running member inclined in one direction relative to a radial line of the concentric members and a cylindrical surface of the second member, the clutch having energizing springs biasing the rollers in a direction to engage the respective cam ramp and the cylindrical surface, and means for adjusting the biasing force of at least some of the springs to maintain their respective rollers in engaged position, the improvement in the adjusting means comprising, a series of movable spring mounting blocks, each block holding one end of an energizing spring, the other end of which biases a roller toward engaged position, a guide track on one of the cage and the mounting blocks, inclined in a direction opposite to the cam ramps, and a guide track follower on the other of the cage and the mounting blocks extending in cooperating relation with each guide track, to allow the mounting blocks to move in response to the centrifugal force of the freely rotating over-running member, the movement of the blocks compressing the energizing springs to a greater extent in response to increased speed of rotation of the over-running member to provide a force sufficient to prevent their respective rollers from moving along the cam ramps in response to the same centrifugal force and out of engagement with the cylindrical surface, thereby maintaining the rollers in proper engaged position to prevent relative rotation of the members in the opposite direction, improved adjusting means thus allowing the over-running member to freely rotate at speeds which would otherwise cause roller disengagement.

* * * * *